US012532126B2

(12) United States Patent
Itoh et al.

(10) Patent No.: US 12,532,126 B2
(45) Date of Patent: Jan. 20, 2026

(54) ELECTROACOUSTIC CONVERSION DEVICE

(71) Applicant: Panasonic Automotive Systems Co., Ltd., Kanagawa (JP)

(72) Inventors: Satoshi Itoh, Osaka (JP); Takayuki Dan, Mie (JP); Shinya Kagawa, Osaka (JP)

(73) Assignee: PANASONIC AUTOMOTIVE SYSTEMS CO., LTD., Kanagawa (JP)

( * ) Notice: Subject to any disclaimer, the term of this patent is extended or adjusted under 35 U.S.C. 154(b) by 125 days.

(21) Appl. No.: 18/627,110

(22) Filed: Apr. 4, 2024

(65) Prior Publication Data

US 2024/0348984 A1 Oct. 17, 2024

(30) Foreign Application Priority Data

Apr. 13, 2023 (JP) ................................ 2023-065573

(51) Int. Cl.

| | |
|---|---|
| ***H04R 9/04*** | (2006.01) |
| ***H04R 1/06*** | (2006.01) |
| ***H04R 7/12*** | (2006.01) |
| ***H04R 9/02*** | (2006.01) |

(52) U.S. Cl.

CPC ............... *H04R 9/046* (2013.01); *H04R 7/12* (2013.01); *H04R 9/025* (2013.01); *H04R 9/045* (2013.01); *H04R 2400/11* (2013.01)

(58) Field of Classification Search

CPC .......... H04R 9/046; H04R 7/12; H04R 9/025; H04R 2400/11; H04R 1/06

USPC ................................ 381/403, 150, 396, 400

See application file for complete search history.

(56) References Cited

U.S. PATENT DOCUMENTS

| | | | | |
|---|---|---|---|---|
| 2008/0056528 | A1 | 3/2008 | Yano et al. | |
| 2021/0329380 | A1 * | 10/2021 | Huang | H04R 7/08 |

FOREIGN PATENT DOCUMENTS

| | | |
|---|---|---|
| JP | 61-139188 | 6/1986 |
| JP | 06-013295 | 2/1994 |
| JP | 2006-217452 | 8/2006 |

* cited by examiner

*Primary Examiner* — Thjuan K Addy

(74) *Attorney, Agent, or Firm* — Greenblum & Bernstein, P.L.C.

(57) ABSTRACT

An electroacoustic conversion device including a diaphragm, an inner voice coil attached to the diaphragm, an outer bobbin disposed in a periphery of the inner voice coil to surround the inner voice coil, an outer voice coil attached to the outer bobbin; a magnetic circuit, and a frame that holds the diaphragm and the magnetic circuit. The outer bobbin includes a plurality of wiring portions in which a pair of inner signal lines are arranged penetrating through, the plurality of wiring portions being hole shaped or notch shaped, the pair of inner signal lines being signal lines of the inner voice coil.

6 Claims, 9 Drawing Sheets

ELECTROACOUSTIC CONVERSION DEVICE

CROSS REFERENCE TO RELATED APPLICATION

The present application is based on and claims priority of Japanese Patent Application No. 2023-065573 filed on Apr. 13, 2023.

FIELD

The present disclosure relates to an electroacoustic conversion device, such as a loudspeaker, a microphone, or the like.

BACKGROUND

Conventionally, a technique that relates to reducing the diameter of a vibrating portion of an electroacoustic conversion device, such as a loudspeaker or the like, to thereby expand a frequency band of the electroacoustic conversion device to include high-end frequencies has been proposed. On the other hand, there is a trade-off between reducing the diameter of such a vibrating portion and efficiency of electric and acoustic conversion. In view of this, Patent Literature (PTL) 1 describes a technique that can expand a frequency band to include high-end frequencies while achieving high efficiency by attaching two voice coils in a coaxial manner in a single diaphragm.

CITATION LIST

Patent Literature

PTL 1: Japanese Unexamined Utility Model (Registration) Application Publication No. H6-13295

SUMMARY

However, the loudspeaker described in the above-mentioned PTL 1 can be improved upon.

The present disclosure provides an electroacoustic conversion device that can further improve upon the above related art.

An electroacoustic conversion device according to one aspect of the present disclosure includes: a diaphragm; an inner voice coil attached to the diaphragm; an outer bobbin disposed in a periphery of the inner voice coil to surround the inner voice coil; an outer voice coil attached to the outer bobbin; a magnetic circuit; and a frame that holds the diaphragm and the magnetic circuit, wherein the outer bobbin includes a plurality of wiring portions in which a pair of inner signal lines are arranged penetrating through, the plurality of wiring portions being hole shaped or notch shaped, the pair of inner signal lines being signal lines of the inner voice coil.

The electroacoustic conversion device according to the present disclosure can further improve upon the related art.

BRIEF DESCRIPTION OF DRAWINGS

These and other advantages and features of the present disclosure will become apparent from the following description thereof taken in conjunction with the accompanying drawings that illustrate specific embodiments of the present disclosure.

FIG. 5 is a perspective view of a portion in which an inner signal line of an outer bobbin according to Embodiment 1 pierces through.

DESCRIPTION OF EMBODIMENTS

Hereinafter, an electroacoustic conversion device according to the present disclosure will be described with reference to the drawings. It should be noted that the following embodiments are merely examples for describing the present disclosure, and are not intended to limit the scope of the present disclosure. For example, the shapes, structures, materials, elements, relative positional relationships, connection states, numerical values, formulas, and details of each of the steps and the order of the steps of the methods, and the like, described in the following embodiments are mere examples, and may include details that are not included in the following descriptions. Furthermore, although geometric expressions, such as “parallel” and “orthogonal”, may be used, these expressions are not mathematically precise indications and include substantially permissible error, deviation, and the like. Moreover, expressions, such as “simultaneous” and “identical (or the same)”, are considered to cover a substantially permissible range of meaning.

Additionally, the drawings are schematic illustrations, which may include emphasis, omission, or adjustment of proportion as necessary for the purpose of illustrating the present disclosure, and thus the shapes, positional relationships, and proportions shown may be different from actuality.

Furthermore, hereinafter, multiple aspects may be comprehensively described as a single embodiment. Moreover, part of the contents in the description below describes optional elements related to the present disclosure.

Embodiment 1

Figure 1:
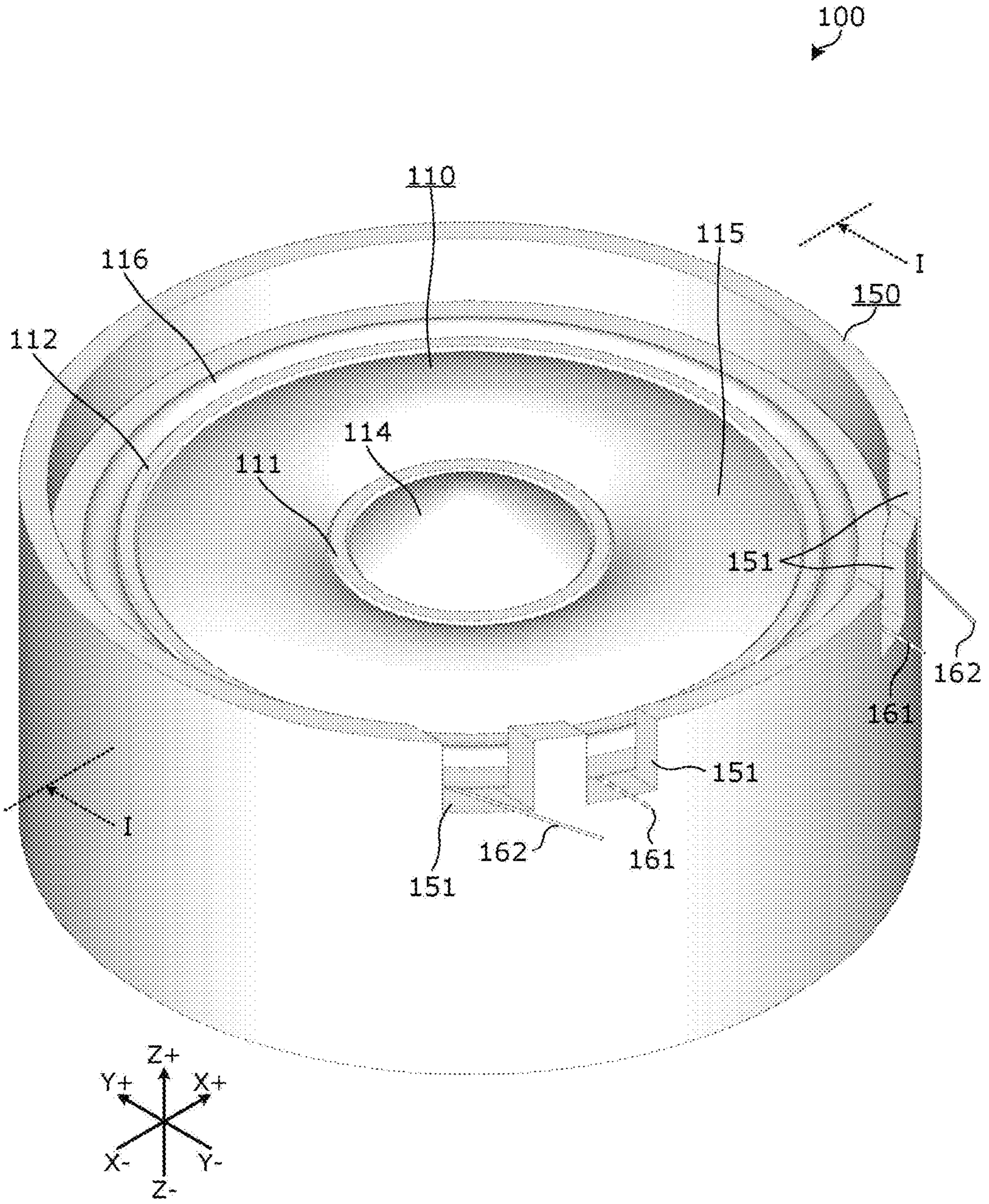
FIG. 1 is a perspective view of an appearance of an electroacoustic conversion device according to Embodiment 1 as viewed when facing a diaphragm.
Figure 2:
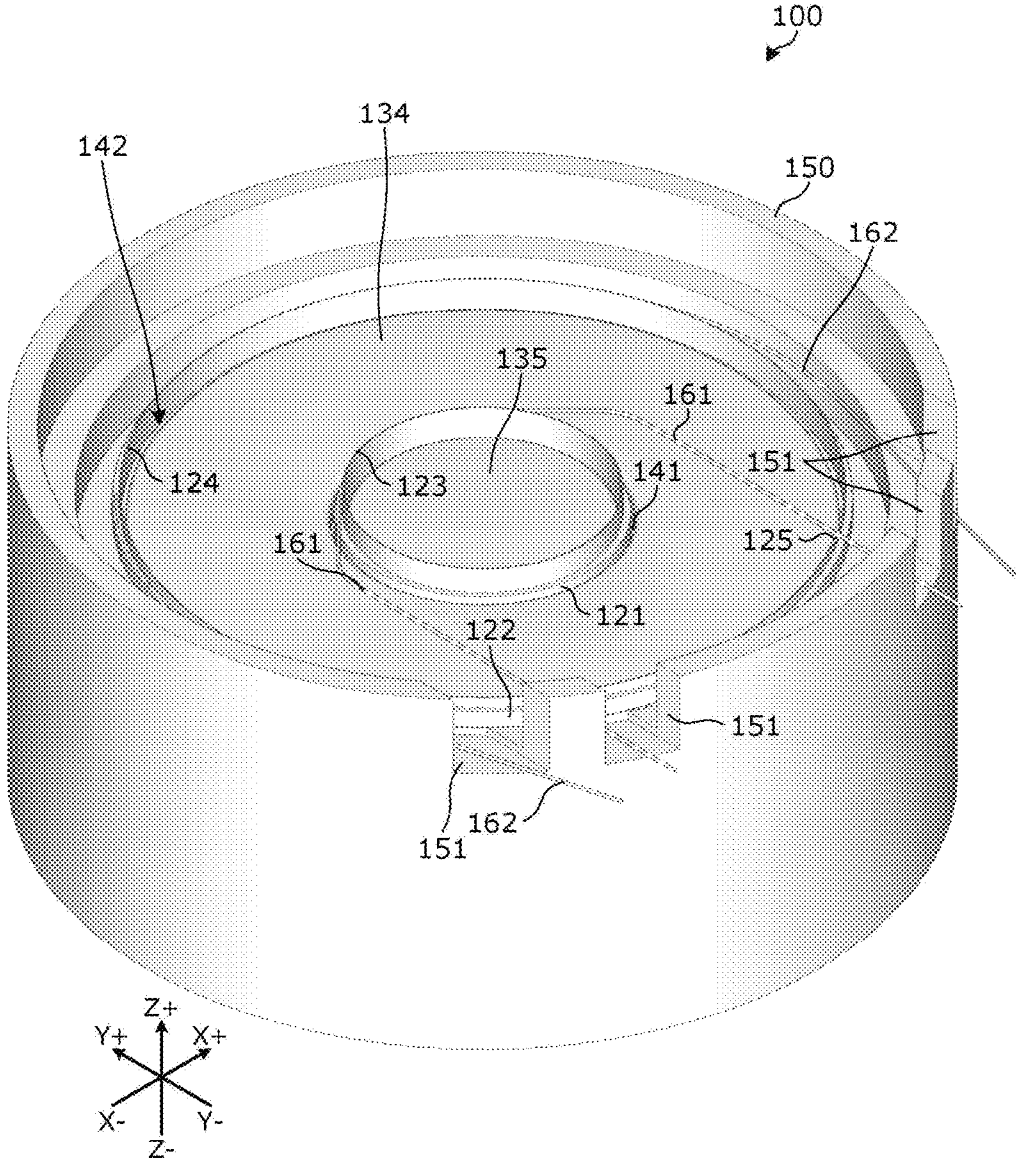
FIG. 2 is a perspective view of the electroacoustic conversion device according to Embodiment 1 with the diaphragm omitted.

FIG. 1 is a perspective view of an appearance of electroacoustic conversion device 100 according to Embodiment 1 as viewed when facing diaphragm 110. FIG. 2 is a perspective view of electroacoustic conversion device 100 according to Embodiment 1 with diaphragm 110 omitted.

Figure 3:
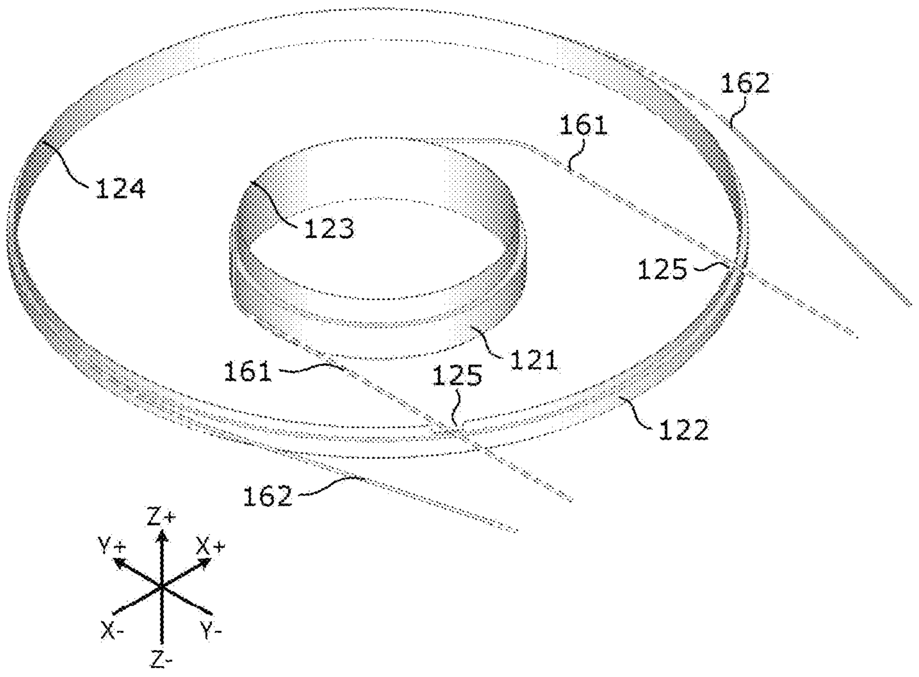
FIG. 3 is a perspective view of an inner voice coil and an outer voice coil of the electroacoustic conversion device according to Embodiment 1.
Figure 4:
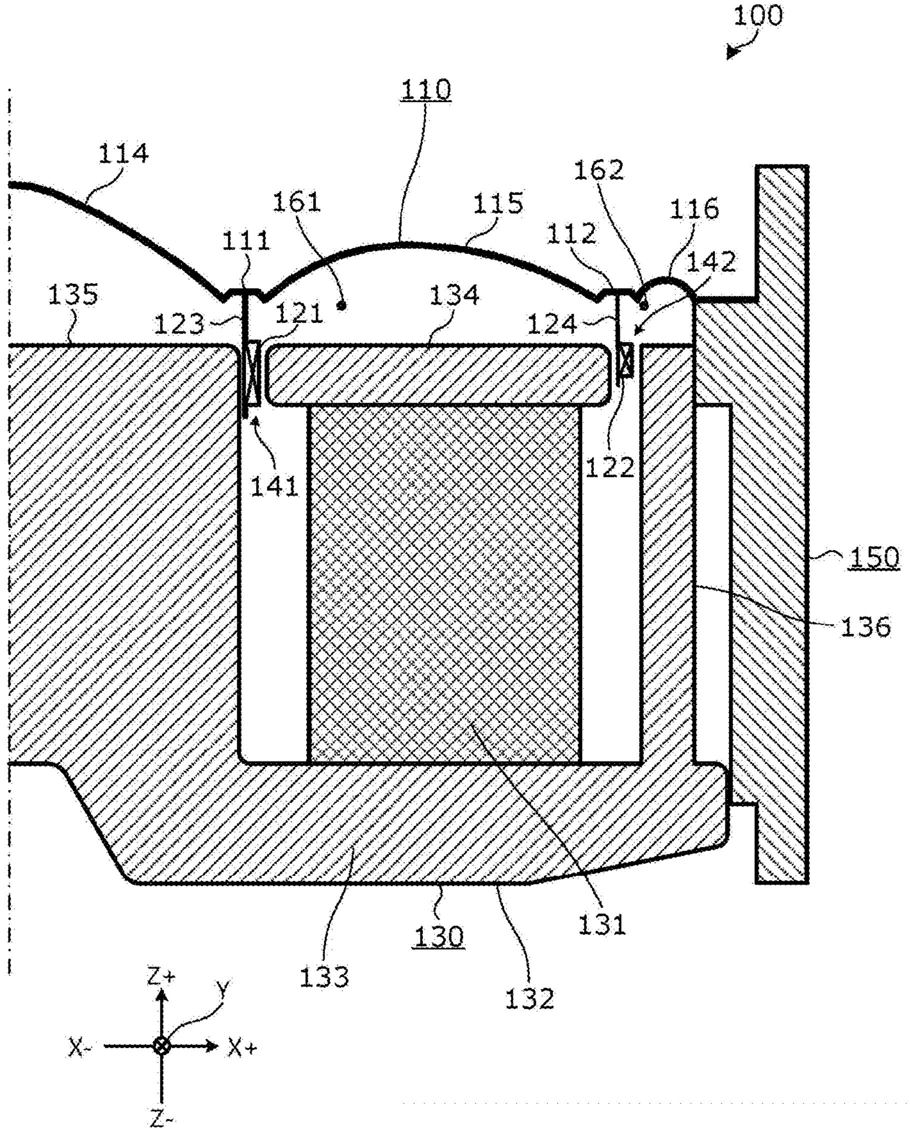
FIG. 4 is a cross-sectional view of the electroacoustic conversion device according to Embodiment 1 taken along line I-I indicated in FIG. 1.

FIG. 3 is a perspective view of inner voice coil 121 and outer voice coil 122 of electroacoustic conversion device 100 according to Embodiment 1. FIG. 4 is a cross-sectional view of electroacoustic conversion device 100 taken along line I-I indicated in FIG. 1.

As shown in these figures, electroacoustic conversion device 100 includes diaphragm 110, inner voice coil 121, outer voice coil 122, magnetic circuit 130, and frame 150.

Diaphragm 110 is a component in which inner voice coil 121 and outer voice coil 122 are coupled, and diaphragm 110 is a component that converts air vibrations generated by displacement in the front-back direction (Z-axis direction in the figures) relative to a neutral position and acoustic signals generated by inner voice coil 121 and outer voice coil 122. Although diaphragm 110 is not limited to any particular shape, in Embodiment 1, the overall shape of diaphragm 110 is circular. Diaphragm 110 includes inner coupling portion 111, which is annular and coupled with inner voice coil 121, and outer coupling portion 112, which is annular and coupled with outer voice coil 122.

Inner coupling portion 111 and outer coupling portion 112 each have a trapezoidal cross section that protrudes outward (Z+ side in the figures). Inner voice coil 121 and outer voice coil 122 are each attached to a flat top surface portion that corresponds to the bottom side of the top of the corresponding trapezoidal cross section. The space located inward from inner coupling portion 111 is sealed by inner membrane portion 114 that is dome shaped and protrudes outward. The cross section of the space between inner coupling portion 111 and outer coupling portion 112 is arc shaped, and inner coupling portion 111 and outer coupling portion 112 are connected by membrane portion 115 that is annular and protrudes outward. The cross section of the space between outer coupling portion 112 and frame 150 is arc shaped, and outer coupling portion 112 and frame 150 are connected by edge 116 that protrudes outward.

It should be noted that the shape of diaphragm 110 may be a cone, an elliptical cone, a pyramid, an elliptical disc, a rectangular plate, or the like. There are no particular limitations on the material of diaphragm 110, and examples include paper, resin, and the like.

Inner voice coil 121 is a component in which one end portion is disposed inside of inner magnetic gap 141 (see FIG. 2 and FIG. 4) and another end portion is attached to inner coupling portion 111 of diaphragm 110, and inner voice coil 121 is a component that converts air vibrations and acoustic signals through an interaction involving the magnetic flux that is constantly present in inner magnetic gap 141 resulting when inner voice coil 121 vibrates together with diaphragm 110.

The winding axis (central axis) of inner voice coil 121 is arranged in the direction of vibration (amplitude) of diaphragm 110 (Z-axis direction in the figures) and is orthogonal to the direction of magnetic flux inside inner magnetic gap 141.

In Embodiment 1, inner voice coil 121 is a coil that has an overall cylindrical shape and includes a single metal wire wrapped around multiple times in a winding axis direction (Z-axis direction in the figures). Furthermore, in inner voice coil 121, multiple layers of coils (two layers in Embodiment 1) are electrically connected in series in a radial direction, and both the winding start point and winding end point are disposed on the side toward diaphragm 110. Additionally, a pair of inner signal lines 161, which are each connected to one of the corresponding ends of the wire that forms the coil, extend out from inner voice coil 121. Inner signal lines 161 will later be described in more detail.

In Embodiment 1, inner voice coil 121 includes inner bobbin 123. Inner bobbin 123 is a cylindrical component that serves as a base around which the wire that forms the coil is wound, and inner bobbin 123 is made of a material, such as aluminum, resin, or the like. It should be noted that inner voice coil 121 need not include an inner bobbin.

Outer voice coil 122 is a component that is attached to diaphragm 110 so as to surround inner voice coil 121 in the periphery (outer side) of inner voice coil 121. Outer voice coil 122 converts vibration in the winding axis direction (Z-axis direction in the figures) and acoustic signals through an interaction involving the magnetic flux constantly present in outer magnetic gap 142 (see FIG. 2 and FIG. 4).

In Embodiment 1, the winding axis of outer voice coil 122 (central axis) is disposed on the same axis as the winding axis of inner voice coil 121. In the same way as inner voice coil 121, outer voice coil 122 is a coil that has an overall cylindrical shape and includes a single metal wire wrapped around multiple times in the winding axis direction (Z-axis direction in the figures). Furthermore, outer voice coil 122 is disposed such that multiple layers of coils (two layers in Embodiment 1) are electrically connected in series in a radial direction, and both the winding start point and the winding end point are disposed on the side toward diaphragm 110. Additionally, outer signal lines 162 extend out from outer voice coil 122.

Outer voice coil 122 includes outer bobbin 124. Outer bobbin 124 is a cylindrical component that serves as a base around which the wire that forms outer voice coil 122 is wound, and outer bobbin 124 is made of a material, such as aluminum, resin, or the like. Outer bobbin 124 includes a pair of wiring portions 125 (see FIG. 2, FIG. 3, and FIG. 5) that are hole shaped or notch shaped through each of which a corresponding one of the pair of inner signal lines 161, which are signal lines extending out from inner voice coil 121, penetrates through.

Figure 5:
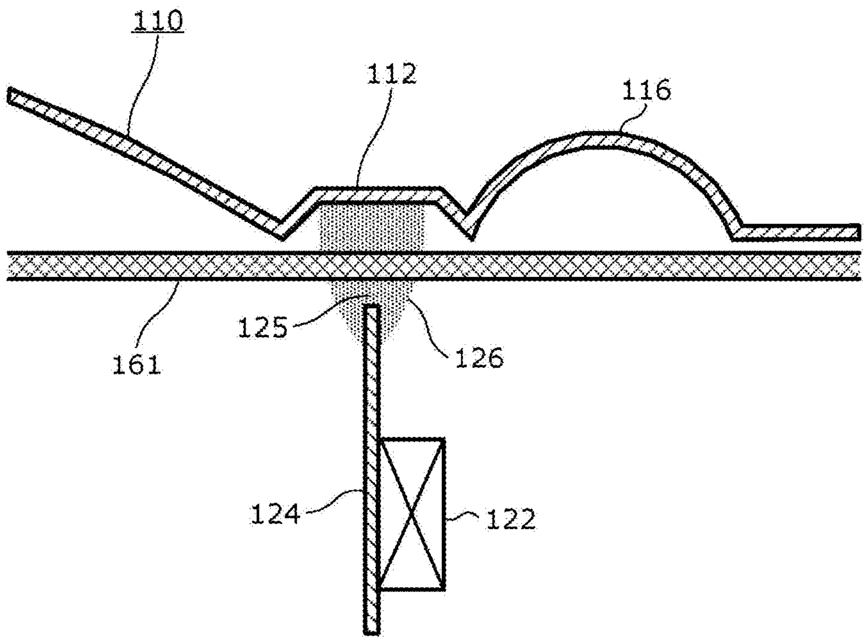

In Embodiment 1, wiring portions 125 are notches that extend from an edge portion on the side closer to diaphragm 110 toward the side opposite diaphragm 110. By setting wiring portions 125 as notches, work to arrange inner signal lines 161 to extend beyond outer bobbin 124 becomes easier to perform. As illustrated in FIG. 5, in wiring portion 125, filling portion 126, which fills wiring portion 125 and fixes a portion of inner signal line 161 passing through wiring portion 125 to outer bobbin 124, is provided. The material and the like of filling portions 126 is not limited to this example. In Embodiment 1, filling portions 126 are formed by an adhesive used when connecting outer bobbin 124 and diaphragm 110. Since inner signal lines 161 that are connected to inner voice coil 121 are arranged so as to penetrate through wiring portions 125 provided in outer bobbin 124, the influence that outer voice coil 122 has on the vibration generated can be inhibited.

It should be noted that the directions in which the wires of inner voice coil 121 and outer voice coil 122 are wound may be the same direction or may be different directions. Winding directions are determined by the phase of the acoustic signal generated by each coil.

Magnetic circuit 130 includes magnet 131 that is a magnetized permanent magnet, and yoke 132 that controls the path of the magnetic field lines emitted by magnet 131 and defines at least inner magnetic gap 141. Magnetic circuit 130 may be of an inner-magnet type or an outer-magnet type, and the shape of magnet 131 and the shape of yoke 132 differ depending on the type. In Embodiment 1, magnetic circuit 130 is of an outer-magnet type, and magnet 131 is annular in shape. Yoke 132 includes top plate 134 that is annular and disposed on a sound emission side of magnet 131, base plate 133 that is annular and disposed at a position so as to sandwich magnet 131 together with top plate 134, center pole 135 that projects outward from an inner-circumferential portion of base plate 133 to top plate 134, and wall portion 136 that is annular and provided so as to rise from an outer-peripheral portion of base plate 133 toward the direction of diaphragm 110. Top plate 134 and center pole 135 are concentrically disposed, and inner magnetic gap 141 is defined by the gap between top plate 134 and center pole 135. The gap between top plate 134 and wall portion 136 defines outer magnetic gap 142.

A magnet with high magnetic energy, such as a neodymium magnet or the like may be used as magnet 131. With this, the thickness of magnet 131 can be reduced, thereby reducing the overall thickness of electroacoustic conversion device 100. Furthermore, the weight of electroacoustic conversion device 100 can also be reduced.

Frame 150 is a component that holds diaphragm 110 via edge 116, and holds magnetic circuit 130. Frame 150 is not limited to any particular shape, and in Embodiment 1, frame 150 is cylindrical. Frame 150 is not limited to any particular material, and in Embodiment 1, frame 150 is a resin-molded part that is electrically insulating. In frame 150, insertion portions 151 are provided in a manner where the pair of inner signal lines 161 that are signal lines that extend from inner voice coil 121 and a pair of outer signal lines 162 that are signal lines that extend from outer voice coil 122 are penetrating through insertion portions 151. Insertion portions 151 are hole shaped or notch shaped (notch shaped in Embodiment 1). Although the number of insertion portions 151 provided in frame 150 is not particularly limited, in Embodiment 1, insertion portions 151 are provided at four locations, and inner signal lines 161 and outer signal lines 162 are each arranged to pass through a corresponding one of insertion portions 151.

Signal lines including inner signal lines 161 and outer signal lines 162 are electrical wires used to input acoustic signals to a voice coil or to output acoustic signals from a voice coil. Signal lines are not limited to any particular type, and a signal line may be a wire that forms a voice coil (also referred to as a magnet wire) or may be a flexible wire (tinsel wire). In Embodiment 1, flexible wire, which has greater flexibility than magnet wire included in inner voice coil 121 is used for inner signal lines 161 and outer signal lines 162.

Inner signal lines 161 are arranged so as to be drawn out from inner bobbin 123 toward wiring portions 125 such that each of inner signal lines 161 are parallel or nearly parallel to top plate 134. Furthermore, on the outside of outer bobbin 124, inner signal lines 161 and outer signal lines 162 are arranged in the same direction (Y-direction in the figures) and to reach outside of frame 150. Inner signal lines 161 and outer signal lines 162 are arranged on virtually the same plane.

In electroacoustic conversion device 100 according to Embodiment 1, since the small area and the light weight of inner membrane portion 114 that corresponds to inner voice coil 121 are advantageous for high frequency vibrations, the frequency band of electroacoustic conversion device 100 can thereby be expanded to cover high-end frequencies. Furthermore, the large area of annular membrane portion 115 that corresponds to outer voice coil 122 is advantageous for the enhancement of sound pressure levels. Accordingly, even when the overall diameter of diaphragm 110 is reduced, inner voice coil 121 and outer voice coil 122 make it possible to enhance the conversion efficiency of acoustic signals and air vibrations.

Additionally, since inner signal lines 161 that are connected to inner voice coil 121 are arranged in a bridge-like manner between inner bobbin 123 and outer bobbin 124, with this, inner signal lines 161 can be prevented from becoming deflected and contacting diaphragm 110 when electroacoustic conversion device 100 is driven.

Embodiment 2

Next, Embodiment 2 of electroacoustic conversion device 100 will be described. It should be noted that elements that achieve the same effects and functions as Embodiment 1, and elements (portions) that have the same shapes, mechanisms, and structures as Embodiment 1 are given the same reference signs and descriptions thereof may be omitted. Furthermore, the following description will focus on the points of difference with Embodiment 1, and descriptions of redundant content may be omitted.

Figure 6:
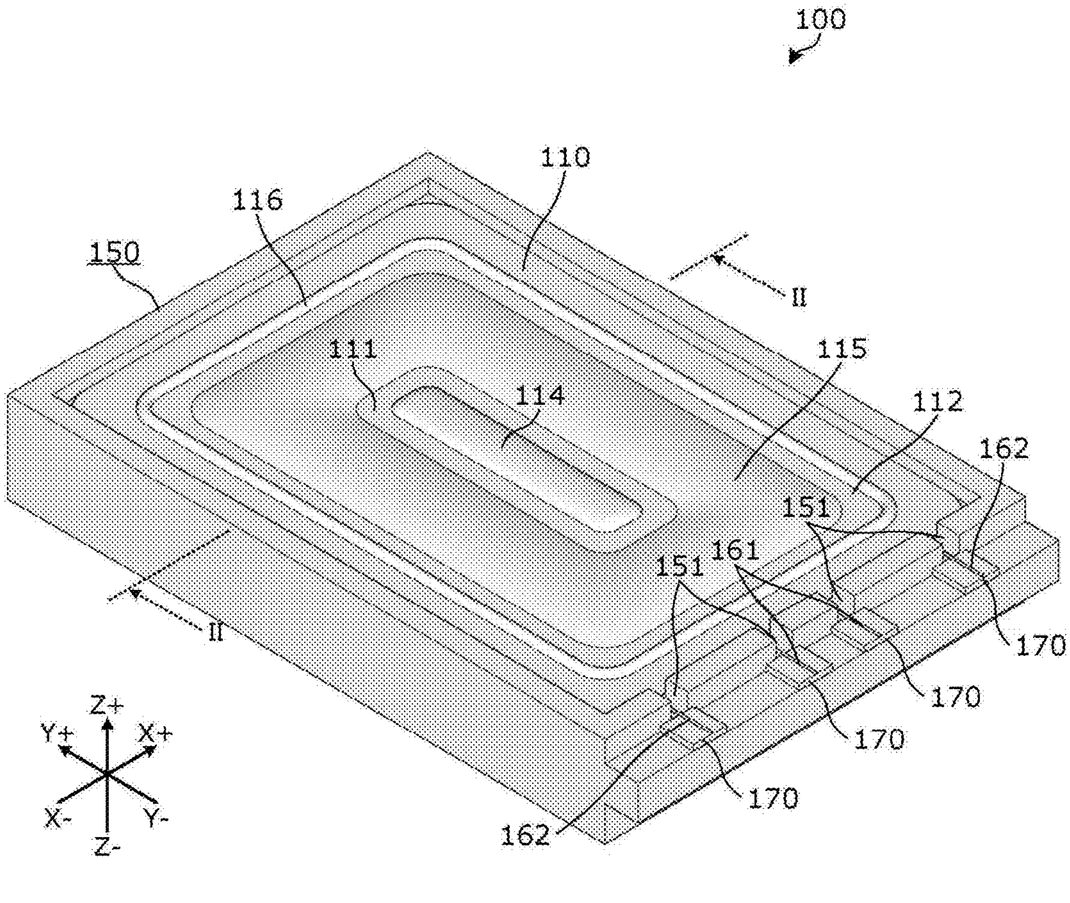
FIG. 6 is a perspective view of an appearance of an electroacoustic conversion device according to Embodiment 2 as viewed when facing a diaphragm.
Figure 7:
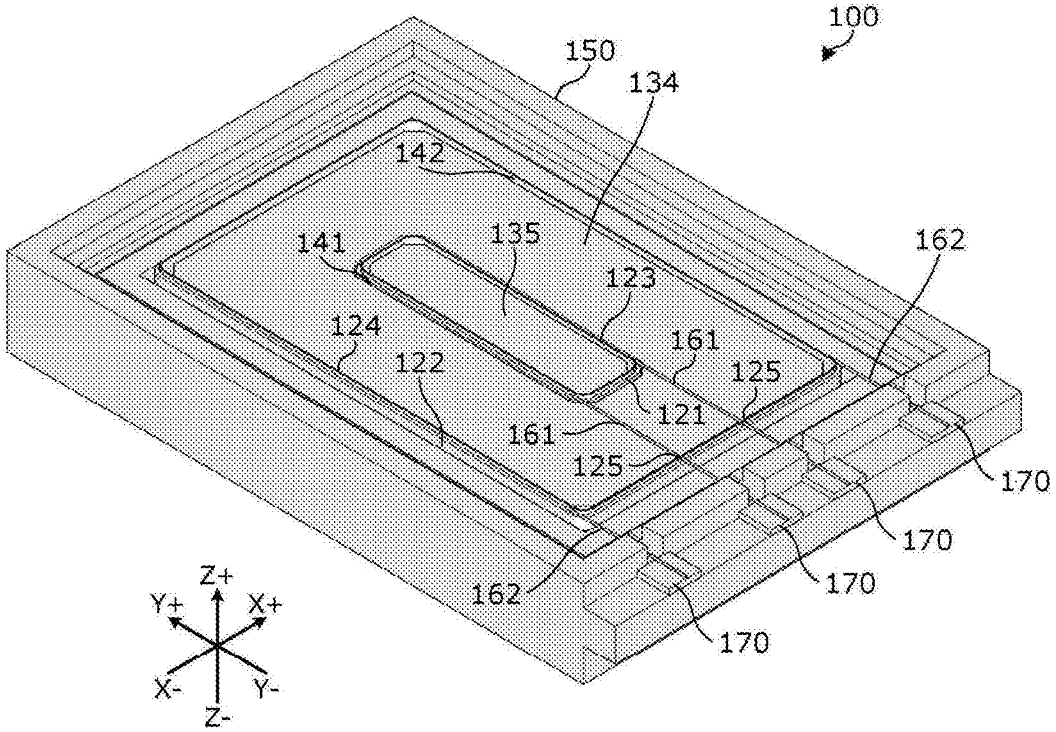
FIG. 7 is a perspective view of the electroacoustic conversion device according to Embodiment 2 with the diaphragm omitted.
Figure 8:
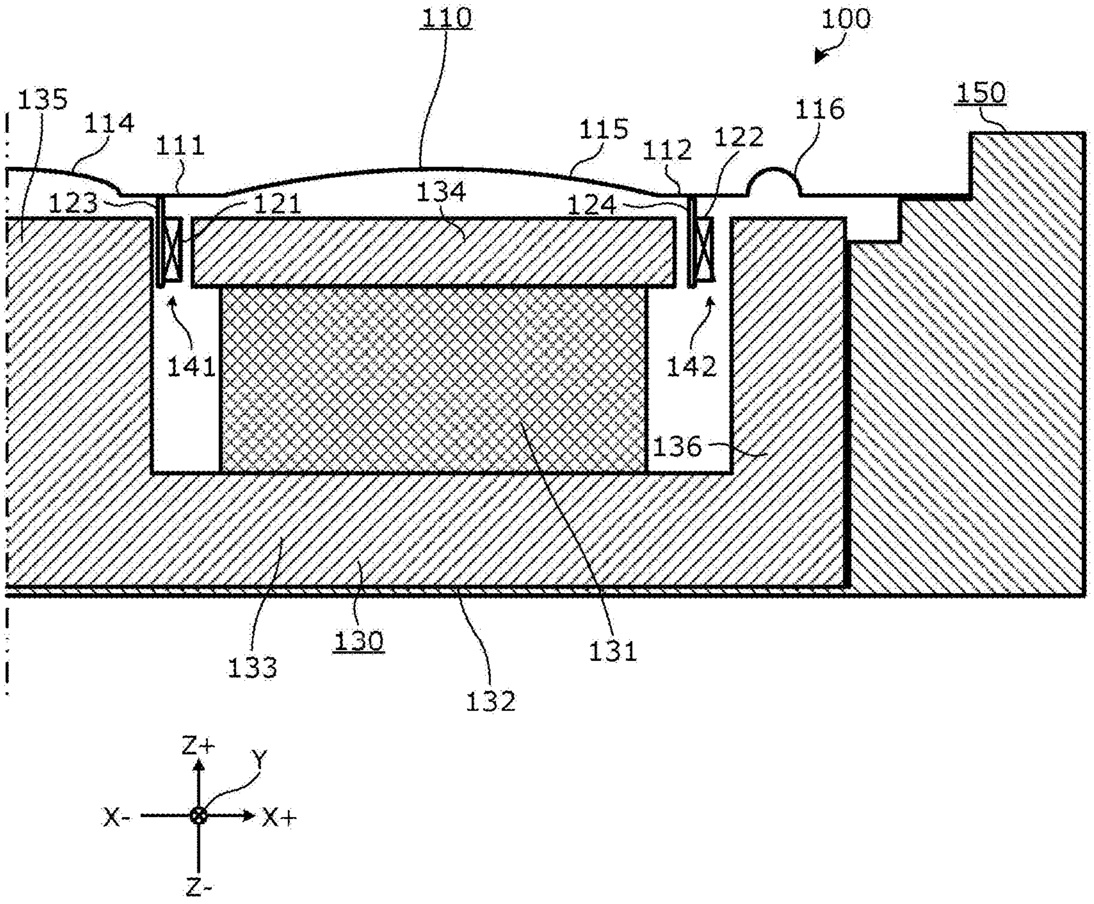
FIG. 8 is a cross-sectional view of the electroacoustic conversion device according to Embodiment 2 taken along line II-II indicated in FIG. 6.

The overall shape of electroacoustic conversion device 100 according to Embodiment 2 is rectangular as illustrated in FIG. 6 and FIG. 7. Diaphragm 110 is rectangular-board shaped. Inner voice coil 121 and outer voice coil 122 are rectangular-ring shaped. Inner bobbin 123 and outer bobbin 124 are also rectangular-ring shaped. Similar to the above-mentioned embodiment, in electroacoustic conversion device 100 according to Embodiment 2, wiring portions 125 are provided, in outer bobbin 124 on which outer voice coil 122 is wrapped around, in a manner such that inner signal lines 161 of inner voice coil 121 penetrate through. Furthermore, filling portions 126 (not illustrated in FIG. 6, FIG. 7, and FIG. 8) that each fix a portion of each inner signal line 161, which penetrates through, to outer bobbin 124 are provided in wiring portions 125.

Magnetic circuit 130 according to Embodiment 2 is also of an outer-magnet type, and magnet 131 is rectangular-ring shaped. Yoke 132 includes top plate 134 that is rectangular-ring shaped and disposed on a sound emission side of magnet 131, base plate 133 that is rectangular-board shaped and disposed at a position so as to sandwich magnet 131 together with top plate 134, center pole 135 that is polygonal-column shaped and projects outward from a central portion of base plate 133 up to top plate 134, and wall portion 136 that is rectangular-ring shaped and provided so as to rise from an outer-peripheral portion of base plate 133 toward diaphragm 110. Top plate 134 and center pole 135 are concentrically disposed, and inner magnetic gap 141 is defined by the gap between top plate 134 and center pole 135. The gap between top plate 134 and wall portion 136 defines outer magnetic gap 142.

Frame 150 according to Embodiment 2 is rectangular-box shaped and houses diaphragm 110, inner voice coil 121, outer voice coil 122, and magnetic circuit 130. Each of terminals 170 to which the leading end of a corresponding one of the signal lines that extend outside of frame 150 is fixed is provided in an outer-circumferential surface of frame 150. Terminals 170 are components to which electrical wires for inputting acoustic signals and outputting acoustic signals are attached. In Embodiment 2, electroacoustic conversion device 100 includes four terminals 170, each of which is connected to a corresponding one of the pair of inner signal lines 161 or a corresponding one of the pair of outer signal lines 162. With this, different acoustic signals can be input and output to and from inner voice coil 121 and outer voice coil 122. For example, an acoustic signal of a frequency range higher than the frequency range of an acoustic signal input to a pair of outer signal lines 162, which are signal lines of outer voice coil 122, may be input from an amplification device to inner signal lines 161.

It should be noted that the present disclosure is not limited to the above embodiments. For example, other embodiments produced by arbitrarily combining or omitting some elements described in the Specification may be included as embodiments of the present disclosure. Moreover, so long as they do not depart from the essence of the present disclosure, that is to say, so long as they do not depart from the intended meaning of the appended claims, variations conceivable by those skilled in the art resulting from modifying the above embodiments are included in the present disclosure.

Figure 9:
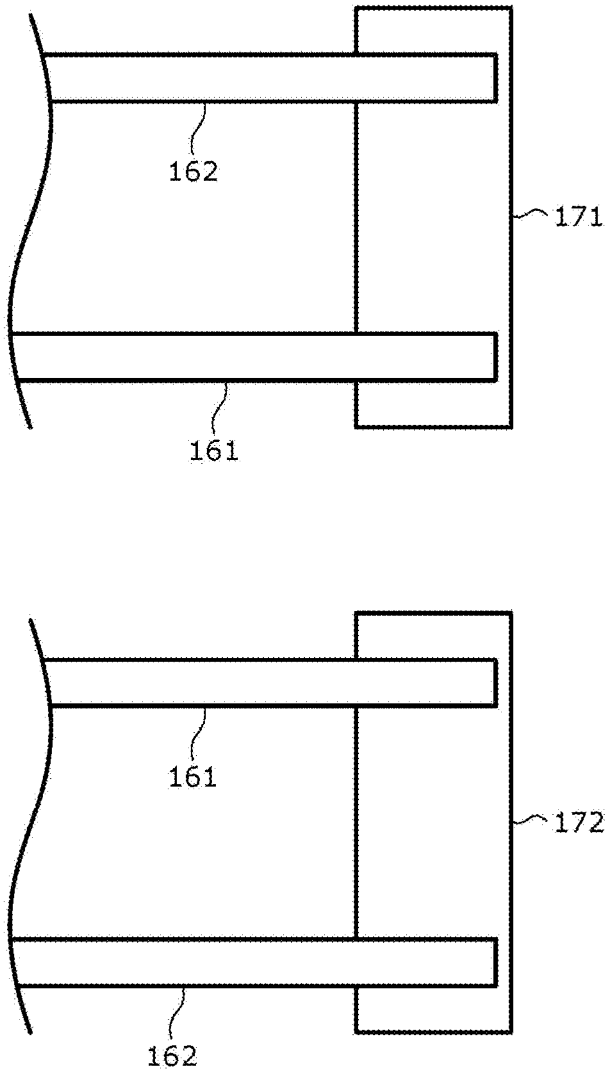
FIG. 9 is a diagram illustrating Connection Example 1 between signal lines and electrodes.

For example, as illustrated in FIG. 9, electroacoustic conversion device 100 may include first terminal 171, to which one of outer signal lines 162 and one of inner signal lines 161 are connected, and second terminal 172, to which another one of outer signal lines 162 and another one of inner signal lines 161 are connected. Accordingly, inner voice coil 121 and outer voice coil 122 can be connected in parallel.

Figure 10:
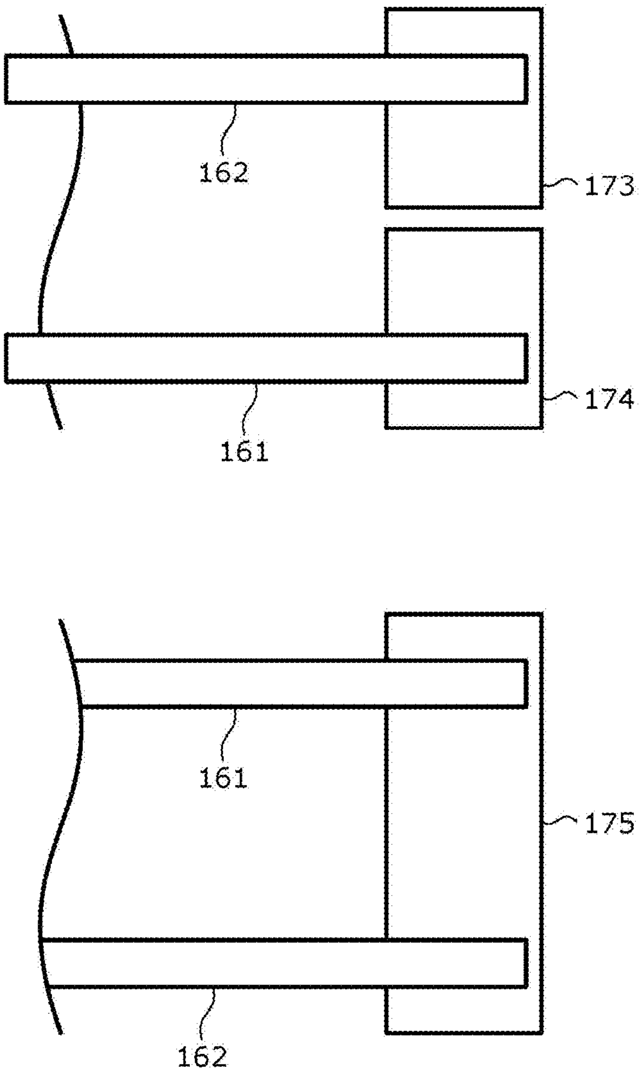
FIG. 10 is a diagram illustrating Connection Example 2 between signal lines and electrodes.

Furthermore, as illustrated in FIG. 10, electroacoustic conversion device 100 may include third terminal 173, to which one of outer signal lines 162 is connected, fourth terminal 174, to which one of inner signal lines 161 is connected, and fifth terminal 175, to which another one of outer signal lines 162 and another one of inner signal lines 161 are connected. Accordingly, inner voice coil 121 and outer voice coil 122 can be connected in series.

While various embodiments have been described herein above, it is to be appreciated that various changes in form and detail may be made without departing from the spirit and scope of the present disclosure as presently or hereafter claimed.

FURTHER INFORMATION ABOUT TECHNICAL BACKGROUND TO THIS APPLICATION

The disclosure of the following patent application including specification, drawings, and claims is incorporated herein by reference in its entirety: Japanese Patent Application No. 2023-065573 filed on Apr. 13, 2023.

INDUSTRIAL APPLICABILITY

The present disclosure is applicable to electroacoustic conversion devices, such as microphones, loudspeakers and the like, and in particular, is applicable to electroacoustic conversion devices that convert between high-end frequency acoustics and acoustic signals.

The invention claimed is:

1. An electroacoustic conversion device comprising:
- a diaphragm;
- an inner voice coil attached to the diaphragm;
- an outer bobbin disposed in a periphery of the inner voice coil to surround the inner voice coil;
- an outer voice coil attached to the outer bobbin;
- a magnetic circuit; and
- a frame that holds the diaphragm and the magnetic circuit, wherein
- the outer bobbin includes a plurality of wiring portions in which a pair of inner signal lines are arranged penetrating through, the plurality of wiring portions being hole shaped or notch shaped, the pair of inner signal lines being signal lines of the inner voice coil.

2. The electroacoustic conversion device according to claim 1, further comprising:
- a plurality of filling portions that fill the plurality of wiring portions, the plurality of filling portions each fixing, to the outer bobbin, a portion of the pair of inner signal lines passing through the plurality of wiring portions.

3. The electroacoustic conversion device according to claim 1, wherein
- each of the pair of inner signal lines is a flexible wire having a flexibility higher than a flexibility of a magnet wire included in the inner voice coil.

4. The electroacoustic conversion device according to claim 1, wherein
- in a periphery of the outer bobbin, a pair of outer signal lines and the pair of inner signal lines are arranged in a same direction to reach outside of the frame, the pair of outer signal lines being signal lines of the outer voice coil.

5. The electroacoustic conversion device according to claim 4, further comprising:
- a first terminal to which one of the pair of outer signal lines and one of the pair of inner signal lines are connected; and
- a second terminal to which an other of the pair of outer signal lines and an other of the pair of inner signal lines are connected.

6. The electroacoustic conversion device according to claim 1, wherein
- an acoustic signal in a frequency range higher than a frequency range of an acoustic signal input to a pair of outer signal lines is input from an amplification device to the pair of inner signal lines, the pair of outer signal lines being signal lines of the outer voice coil.

* * * * *